(No Model.)
M. STRANSKY.
HANDLE FOR TEA OR COFFEE POTS.
No. 496,583. Patented May 2, 1893.
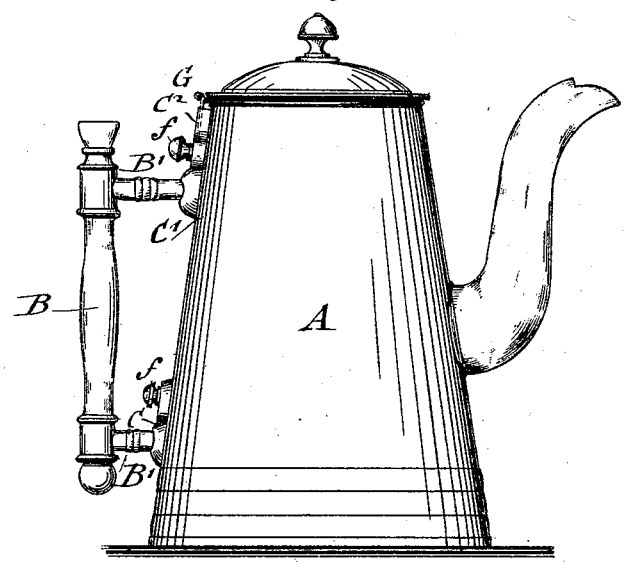
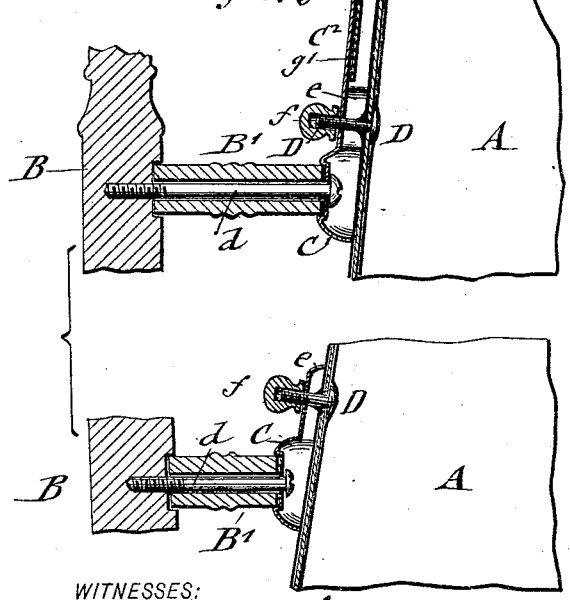
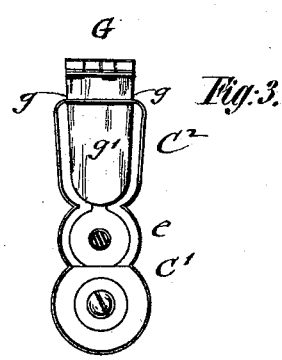
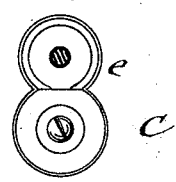
WITNESSES:
H. Billard Griffiths
William Duehrn
INVENTOR
Maurice Stransky
BY Goepel & Raegener
ATTORNEYS.

UNITED STATES PATENT OFFICE.

MAURICE STRANSKY, OF NEW YORK, N. Y.

HANDLE FOR TEA OR COFFEE POTS.

SPECIFICATION forming part of Letters Patent No. 496,583, dated May 2, 1893.

Application filed January 21, 1893. Serial No. 459,245. (No model.)

*To all whom it may concern:*

Be it known that I, MAURICE STRANSKY, a citizen of the United States, and a resident of New York, county and State of New York, have invented certain new and useful Improvements in Handles for Tea and Coffee Pots, of which the following is a specification.

This invention relates to an improved handle for enameled hollow ware, such as coffee-pots, tea-pots and similar articles, which can be conveniently attached to said goods after the same are enameled; and the invention consists of a handle for enameled hollow ware which is made of any suitable non-conductor of heat and which is applied by metallic lugs that are attached to the brackets of the handle and screw-nuts to threaded posts on the body of the pot or other vessel. The upper lug of the handle is extended to the rim of the vessel, the extension supporting one leaf of a hinge, the other leaf of which is attached to the lid, so that the extension of the lug and the hinge form the connection with the lid, as will be fully described hereinafter and finally pointed out in the claims.

In the accompanying drawings, Figure 1, represents a side-elevation of a coffee-pot with my improved handle. Fig. 2, is a vertical central section of the handle, drawn on a larger scale and showing its attachment to the post, and Figs. 3 and 4, are detail rear-views respectively of the upper and lower metallic lugs by which the handle is attached to the body of the pot or other vessel.

Similar letters of reference indicate corresponding parts

Referring to the drawings A represents a coffee-pot or other enameled sheet-metal vessel and B the handle which is provided with horizontal brackets B' that extend at right angles from the handle B. The handle B and its brackets B' are preferably made of japanned wood or other suitable non-conductor of heat. To the inner ends of the brackets B' are applied metallic lugs C C' which are secured to the brackets B' B' by suitable fastening screws $d$, that pass through the brackets and engage the handle B. The lugs C C' are provided above the brackets with eyes $e\ e$ which are placed on threaded posts D D, which are riveted to the body of the pot or other vessel A. The posts D D are threaded after the enameling process is completed, so that the lugs can be firmly attached thereto by means of ornamental screw-nuts $f$, as shown clearly in Figs. 1 and 2. The lugs C C' are preferably stamped by suitable dies with slanting rims, so as to present an ornamental appearance. The upper lug C' is extended in upward direction to the rim of the vessel A, the extension $C^2$ being provided with a transverse slit $g$ for inserting the lower leaf $g'$ of a hinge G, which leaf is soldered to the inside of the extension $C^2$ of the lug C' in order to make a better finish while the upper leaf $g^2$ of the hinge G is soldered to the under side of the rim of the lid A' of the vessel A so that the extension $C^2$ of the upper lug forms with the hinge G a hinge-support for the lid. The lugs are preferably stamped from sheet-metal and finished by silver or nickel plating as desired, thus forming an ornamental means of attachment of the handle to the vessel A.

Having thus described my invention, I claim as new and desire to secure by Letters Patent—

1. The combination, with a hollow sheet-metal vessel having fixed posts with threaded shanks, of a handle provided with brackets, and metallic connecting lugs attached to the brackets of the handle and to the threaded posts of the vessel, substantially as set forth.

2. The combination, with the body of a hollow sheet-metal vessel, said body being provided with riveted posts having exteriorly-threaded shanks, of a handle provided with brackets, lugs having eyes, screws for attaching said lugs to the brackets, and screw-nuts by which the eyes of the lugs are attached to the threaded posts of the body of the vessel, substantially as set forth.

3. The combination, with the body of a hollow sheet metal vessel, said body having fixed and threaded posts, of a handle having brackets and lugs attached to said brackets and provided with eyes which are applied to the posts of the vessel, screw-nuts for attaching the lugs to the posts, the upper lug being extended in upward direction to the rim of the vessel, and a hinge by which the extension of the upper lug is connected with the lid, substantially as set forth.

4. The combination, with a lid of a hollow sheet-metal vessel, of a lug attached to a threaded post on the body of the vessel, said lug being provided with a slit at the upper end into which one leaf of the hinge is inserted while the second leaf of the hinge is attached to the rim of the lid, substantially as set forth.

In testimony that I claim the foregoing as my invention I have signed my name in presence of two subscribing witnesses.

MAURICE STRANSKY.

Witnesses:
PAUL GOEPEL,
CHARLES SCHROEDER.